(12) United States Patent
Yasui

(10) Patent No.: US 10,207,523 B2
(45) Date of Patent: Feb. 19, 2019

(54) RECEIPT PRINTER, RECEIPT PRINTER SYSTEM, AND CONTROL METHOD

(71) Applicant: TOSHIBA TEC KABUSHIKI KAISHA, Tokyo (JP)

(72) Inventor: Yuji Yasui, Izunokuni Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/820,557

(22) Filed: Nov. 22, 2017

(65) Prior Publication Data
US 2018/0141350 A1 May 24, 2018

(30) Foreign Application Priority Data
Nov. 24, 2016 (JP) ................. 2016-228271

(51) Int. Cl.
B41J 11/66 (2006.01)
G06Q 20/20 (2012.01)

(52) U.S. Cl.
CPC .......... *B41J 11/663* (2013.01); *G06Q 20/209* (2013.01)

(58) Field of Classification Search
CPC ......... B41J 11/663; G06Q 20/209; G07F 9/00
See application file for complete search history.

(56) References Cited

U.S. PATENT DOCUMENTS

2002/0094222 A1* 7/2002 Furuya ................. B41J 3/4075
400/615.2

FOREIGN PATENT DOCUMENTS

JP H06-208673 7/1994

OTHER PUBLICATIONS

Machine-generated translation of JP 06-208673, published on Jul. 1994.*

* cited by examiner

*Primary Examiner* — Huan Tran
(74) *Attorney, Agent, or Firm* — Patterson & Sheridan, LLP

(57) ABSTRACT

A receipt printer according to an embodiment includes a sheet roller that transports a sheet from a sheet roll to a receipt issuing port. A printing device prints receipt data on the sheet. A cutter configured performs full cutting so that the sheet is separated from the sheet roll and partial cutting so that the sheet remains partially connected to the sheet roll. A processor controls the cutter to perform the partial cutting after the printing device prints the receipt data on the sheet, and also controls the cutter to perform the full cutting when a predetermined condition is satisfied after the partial cutting is performed.

20 Claims, 5 Drawing Sheets

RECEIPT PRINTER, RECEIPT PRINTER SYSTEM, AND CONTROL METHOD

CROSS-REFERENCE TO RELATED APPLICATION

This application is based upon and claims the benefit of priority from Japanese Patent Application No. 2016-228271, filed Nov. 24, 2016, the entire contents of which are incorporated herein by reference.

FIELD

Embodiments described herein relate generally to a receipt printer, a receipt printer system using the receipt printer, and a control program for the receipt printer.

BACKGROUND

Many devices related to paying and receiving money—such as a Point-of-Sales (POS) terminal, a settlement terminal, or an automatic teller machine (ATM)—include a receipt printer. In general, the receipt printer conveys a strip-shaped sheet to a receipt issuing port and prints a received amount or the like with a printing head. The receipt printer cuts the printed sheet in front of the issuing port with a cutter and issues the receipt. However, if the receipt is completely cut, there is a concern that the receipt falls from the issuing port and is lost. Therefore, there is known a receipt printer which prevents the receipt from falling from the issuing port by performing partial cutting by which the sheet is partially cut without performing full cutting.

The receipt issued with the partial cutting is separated, for example, when a user pulls a tip thereof and detaches the receipt from the remaining sheet. Thus, as long as the user does not detach the receipt from the sheet, the receipt remains in the issuing port while still connected to the sheet.

In particular, in a semi-self-service type settlement terminal, a self-service type POS terminal, or the like, if the user for whom the receipt is issued does not take the receipt, the receipt remains in the issuing port, which creates a problem for the next user. Therefore, it may be necessary for a staff member to remove the remaining receipt before the next user uses the terminal. It is also conceivable to install a device, separate from the receipt printer itself, for collecting the receipt left in the issuing port. However, such a device is not desirable due to extra equipment cost.

DETAILED DESCRIPTION

Embodiments provide a receipt printer which can automatically eliminate a receipt left in an is suing port without increasing equipment cost, and a receipt printer system using the receipt printer.

A receipt printer according to an embodiment includes a sheet roller that transports a sheet from a sheet roll to a receipt issuing port. A printing device prints receipt data on the sheet. A cutter configured performs full cutting so that the sheet is separated from the sheet roll and partial cutting so that the sheet remains partially connected to the sheet roll. A processor controls the cutter to perform the partial cutting after the printing device prints the receipt data on the sheet, and also controls the cutter to perform the full cutting when a predetermined condition is satisfied after the partial cutting is performed.

Hereinafter, embodiments of a receipt printer which can automatically eliminate a receipt left in an is suing port without increasing equipment cost, and a receipt printer system using the receipt printer will be described with reference to the accompanying drawings.

First Embodiment

Figure 1:
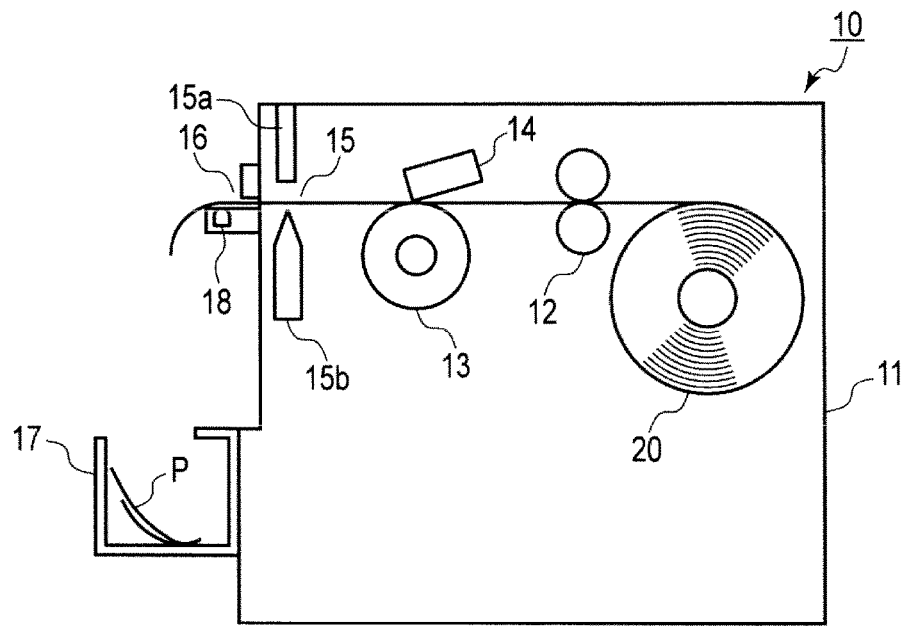
FIG. 1 is a schematic view illustrating an example of a receipt printer according to an embodiment.
Figure 2:
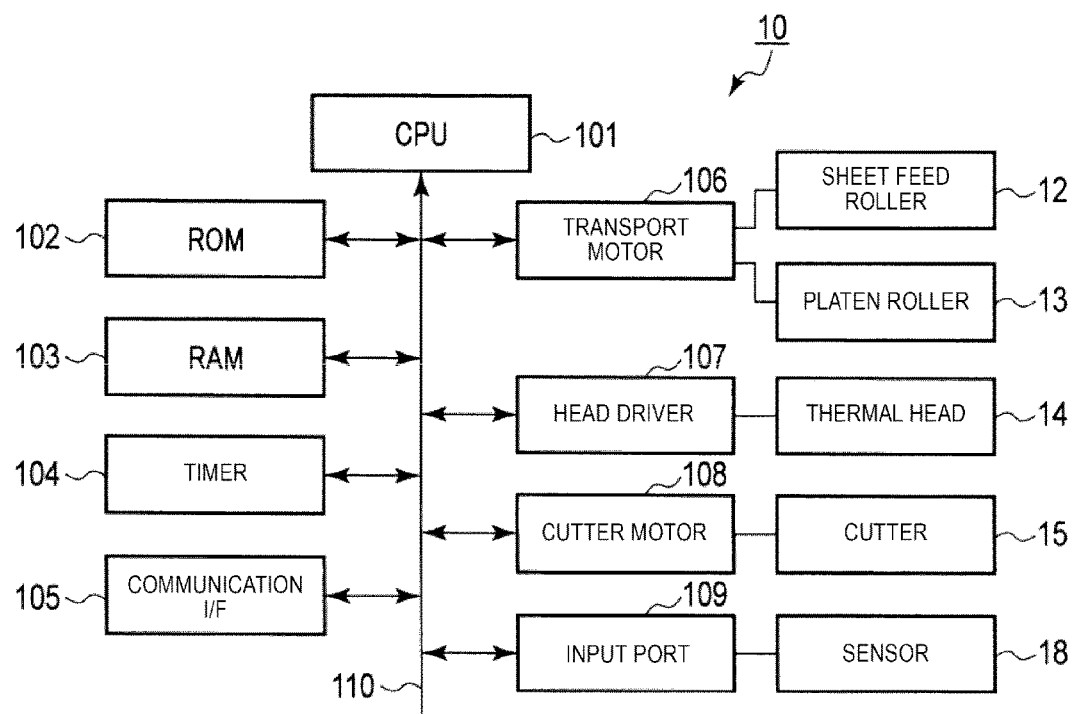
FIG. 2 is a block diagram illustrating an example configuration of the receipt printer.

FIGS. 1 and 2 illustrates a receipt printer 10 (FIGS. 1 and 2) according to a first embodiment, which can be used in a receipt printer system by connecting to a semi-self-service type settlement terminal 30 (FIG. 3) as a host machine. The semi-self-service type checkout system includes a registration terminal that generates accounting data necessary for settlement of a transaction and a settlement terminal that executes a transaction settlement processing based on the accounting data are separated. For example, a store clerk may operate the registration terminal, and a customer may operate the settlement terminal.

FIG. 1 is a schematic view illustrating an example of the receipt printer 10. The receipt printer 10 includes a housing 11 that accommodates a sheet roll 20, which is a strip-shaped sheet wound in a roll shape. The receipt printer 10 includes a sheet feed roller 12, a platen roller 13, a thermal head 14, and a cutter 15, all disposed within the housing 11. The receipt printer 10 is provided with a receipt issuing port 16 on one side surface of the housing 11. The receipt printer 10 also includes a sheet transport path along which the sheet 20 is conveyed, so that a leading end of the sheet roll 20 accommodated in the housing 11 is discharged from the receipt issuing port 16.

The sheet feed roller 12 is positioned at the most upstream side of the sheet transport path, that is, on the side closest to the sheet roll 20. The sheet feed roller 12 nips the leading end of sheet roll 20 fed out from the roll shape with a pair of rollers and transports the leading edge to a downstream side by a rotational force thereof.

The platen roller 13 is positioned on the downstream side of the sheet feed roller 12. The platen roller 13 further transports the leading edge of the sheet roll 20 to the downstream side by the rotation thereof.

The thermal head 14 is positioned facing the platen roller 13 with the sheet transport path interposed therebetween. The thermal head 14 prints the receipt printing data on a portion of the sheet roll 20 transported on the platen roller 13 using, for example, a thermosensitive printing process.

The cutter 15 is positioned at the most the downstream side of the sheet transport path, that is, in front of the receipt issuing port 16. The cutter 15 includes a fixed blade 15a provided above the sheet transport path and a movable blade 15b below the sheet transport path. The cutter 15 cuts the sheet roll 20 discharged from the receipt issuing port 16, at a position upstream of the receipt issuing port 16 by moving the movable blade 15b upward and toward the fixed blade 15a with the sheet roll 20 positioned therebetween. In this case, the movable blade 15b may move a first moving amount so that a sheet piece P of the sheet roll 20 remains attached by a small portion. On the other hand, the movable blade 15b may move a second moving amount larger than the first moving amount so that the sheet piece P of the sheet roll 20 is completely cut off. That is, the cutter 15 can perform full cutting for completely cutting the sheet piece P of the sheet roll 20 and partial cutting for leaving apart of the sheet piece P attached to the sheet roll 20.

Moreover, the sheet piece P which is fully cut by the cutter 15 falls from the receipt issuing port 16 by gravity. Therefore, in the receipt printer 10, a box 17 for accommodating the sheet piece P is attached below the receipt issuing port 16. In addition, in the receipt printer 10, a sensor 18 is provided in the vicinity of the receipt issuing port 16 to detects the presence or absence of the portion of the sheet roll 20 discharged from the receipt issuing port 16. The sensor 18 is, for example, an optical sensor. The sensor 18 outputs an ON signal while detecting the sheet 20, and outputs an OFF signal when it does not detect the sheet 20.

FIG. 2 is a block diagram illustrating an example configuration of the receipt printer 10. The same reference numerals are given to the portions common to FIG. 1.

The receipt printer 10 includes a Central Processing Unit (CPU) 101, a Read Only Memory (ROM) 102, a Random Access Memory (RAM) 103, a timer 104, a communication interface 105, a transport motor 106, a head driver 107, a cutter motor 108, an input port 109, and a system transmission path 110. The system transmission path 110 includes an address bus and a data bus, and provides communication between the CPU 101, the ROM 102, the RAM 103, the timer 104, the communication interface 105, the transport motor 106, the head driver 107, the cutter motor 108, and the input port 109.

The CPU 101 is connected to the ROM 102 and the RAM 103 via the system transmission path 110 to function as a computer. The CPU 101 corresponds to a central processor of the computer. The CPU 101 controls each hardware unit in order to realize various functions of the receipt printer 10 according to a program such as an operating system, middleware, and/or application program.

The ROM 102 and the RAM 103 correspond to a main memory of the computer. The ROM 102 stores programs such as the operating system, middleware, and application program. The RAM 103 stores setting data to be referred to when the CPU 101 performs various processes. The RAM 103 is also used as a so-called work area for storing data temporarily used by the CPU 101 when performing various processes. The RAM 103 may store the middleware or the application program. Similarly, the ROM 102 may also store the setting data.

The timer 104 measures a predetermined. For example, the timer 104 provides a signal when the predetermined time has elapsed. Although the predetermined time is arbitrary, it is preferable to set the predetermined time according to the shortest time required for the accounting data for a subsequent customer to be sent from the registration terminal to the settlement terminal 30 after issuing the receipt for a current customer in the receipt printer 10.

The communication interface 105 connects the settlement terminal 30 that is the host machine and performs data communication with the settlement terminal 30. Here, the communication interface 105 functions as a communication unit of the receipt printer 10.

The transport motor 106 drives the sheet feed roller 12 and the platen roller 13. The sheet feed roller 12 and the platen roller 13 are rotated in a predetermined direction by the transport motor 106 and transports the sheet roll 20 to the receipt issuing port 16. Here, the sheet feed roller 12, the platen roller 13, and the transport motor 106 function as a transport unit that transports the sheet roll 20 to the receipt issuing port 16.

The head driver 107 drives the thermal head 14. The thermal head 14 prints the receipt printing data on the sheet roll 20 based on control from the head driver 107. Here, the thermal head 14 and the head driver 107 function as the printing unit that prints the receipt printing data on the sheet 20 transported to the receipt issuing port 16.

The cutter motor 108 drives the movable blade 15b of the cutter 15. The cutter motor 108 can be driven in two stages of a partial cutting for driving the movable blade 15b by the first moving amount and a full cutting for driving the movable blade 15b by the second moving amount. If the cutter motor 108 performs the partial cutting drive, the cutter 15 leaves the sheet piece P attached to the sheet roll 20 by a small portion. If the cutter motor 108 performs the full cutting drive, the cutter 15 completely cuts the sheet piece P from the sheet roll 20. Here, the cutter 15 and the cutter motor 108 function as the cutting unit capable of performing full cutting for separating the sheet piece P of the from the sheet roll 20 in front of the receipt issuing port 16 and partial cutting for leaving a small portion thereof attached.

The input port 109 receives the ON signal or the OFF signal output from the sensor 18. The CPU 101 determines whether or not the sensor 18 detects the sheet 20 based on the signal received via the input port 109.

Figure 3:
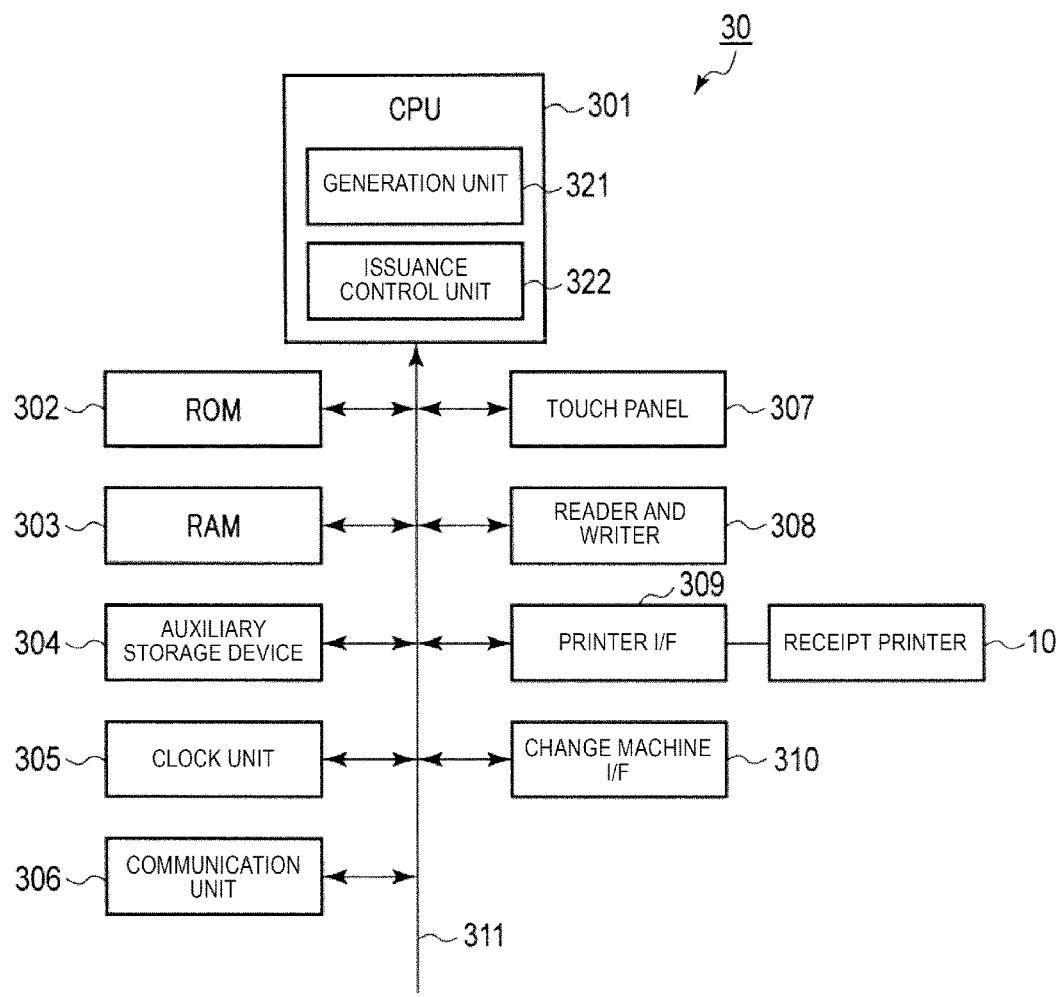
FIG. 3 is a block diagram illustrating an example configuration of a settlement terminal that is a host machine of the receipt printer according to a first embodiment.

FIG. 3 is a block diagram illustrating an example configuration of the settlement terminal 30. The settlement terminal 30 includes a CPU 301, a ROM 302, a RAM 303, an auxiliary storage device 304, a clock unit 305, a communication unit 306, a touch panel 307, a reader and writer 308, a printer interface 309, a change machine interface 310, and a system transmission path 311. The system transmission path 311 includes an address bus and a data bus, and provides communication between the CPU 301, the ROM 302, the RAM 303, the auxiliary storage device 304, the clock unit 305, the communication unit 306, the touch panel 307, the reader and writer 308, the printer interface 309, and the change machine interface 310.

The CPU 301 is connected to the ROM 302, the RAM 303, and the auxiliary storage device 304 via the system transmission path 311, and functions as a computer. The CPU 301 corresponds to a central processor of the computer. The CPU 301 controls each functional unit in order to realize various functions of the settlement terminal 30 according to a program such as an operating system, middleware, and/or application program.

The ROM 302 and the RAM 303 correspond to a main memory of the computer. The ROM 302 stores the program such as the operating system, middleware, and application program. The RAM 303 stores setting data to be referred to when the CPU 301 performs various processes. The RAM 303 is also used as a so-called work area for storing data temporarily used by the CPU 301 when performing various processes. The RAM 303 may store the middleware or the application program. Similarly, the ROM 302 may also store the setting data.

The auxiliary storage device 304 corresponds to the auxiliary storage unit of the computer. For example, a Hard Disc Drive (HDD), a Solid State Drive (SSD), an Electric Erasable Programmable Read-Only Memory (EEPROM), or the like is used as the auxiliary storage device 304. The auxiliary storage device 304 stores data used by the CPU 301 performing various processes or data generated by the processing in the CPU 301. The auxiliary storage device 304 may store the application program.

The clock unit 305 functions as a time information source of the settlement terminal 30. The CPU 301 determines the current date and time based on the time information provided by the clock unit 305.

The communication unit 306 connects the registration terminal via a wired or wireless network and receives the accounting data sent from the registration terminal.

The touch panel 307 functions as an input device and a display device of the settlement terminal 30. The touch panel 307 displays a selection screen for selecting a payment method such as cash or electronic money, a payment status check screen based on the selected payment method, or the like. A settlement button for instructing check termination by the settler is also displayed on the check screen.

The reader and writer 308 reads data recorded in a recording medium, for example, a card or an integrated circuit (IC) chip which is one type of a payment medium, and writes the data to the recording medium. The card may be anyone of various cards for recording information related to settlement processing such as a member card and a point card in addition to settlement cards such as a credit cards, a debit card, an electronic money card, and a prepaid card. The IC chip may be provided in an information terminal such as a smartphone in addition to the above-described various cards.

The printer interface 309 provides for communication with the receipt printer 10. The printer interface 309 outputs the receipt printing data generated by the CPU 301 to the receipt printer 10.

The change machine interface 310 connects an automatic change machine. The change machine interface 310 captures data regarding the denomination and amount of cash inserted into the automatic change machine. In addition, the change machine interface 310 outputs change data generated by the CPU 301 to the automatic change machine.

The settlement terminal 30 causes the CPU 301 to function as a generation unit 321 and an issuance control unit 322 based on a control program that is one type of an application program stored in the ROM 302 or the RAM 303. The generation unit 321 generates the receipt printing data based on the accounting data received from the registration terminal and payment data according to a payment method selected from the selection screen. The issuance control unit 322 outputs the receipt printing data to the receipt printer 10 in response to the input of the settlement button of the check screen, and controls issuance of the receipt on which the receipt printing data is printed.

Figure 4:
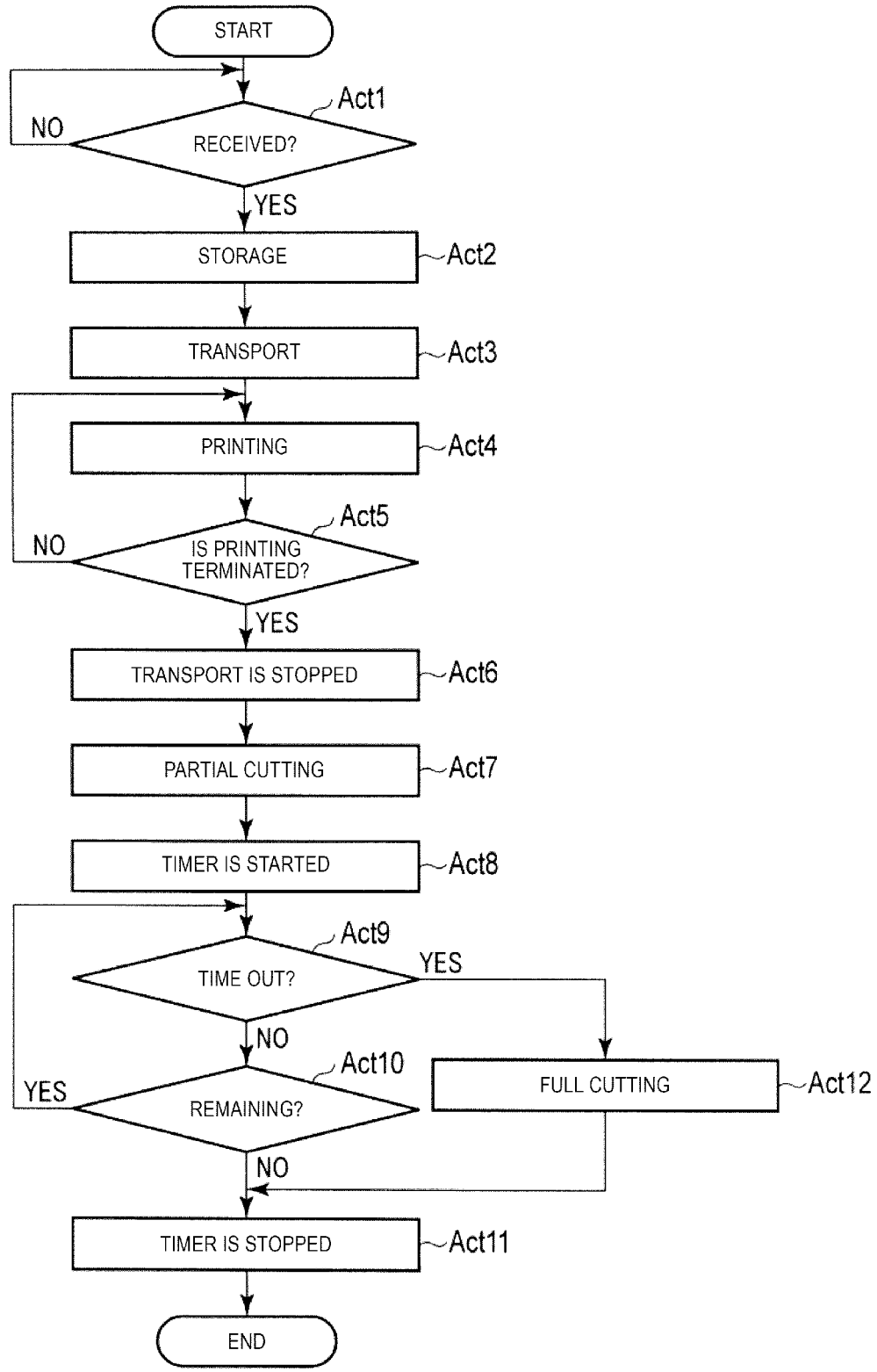
FIG. 4 is a flowchart illustrating an example sequence of operations for a control procedure related to receipt issuance executed by a CPU of the receipt printer according to the first embodiment.

FIG. 4 is a flowchart illustrating an example sequence of operations for a control procedure related to receipt issuance executed by the CPU 101 of the receipt printer 10. The procedure is performed in accordance with a program stored in the ROM 102 or the RAM 103. The control procedure illustrated in FIG. 4 and described below is an example and, if the same result can be obtained, the control procedure and the control content thereof are not particularly limited.

The CPU 101 waits for receipt of the receipt printing data, in a standby state, in Act 1. When the receipt printing data is received from the settlement terminal 30 via the communication interface 105 (Yes in Act 1), the CPU 101 stores the receipt printing data, in Act 2. Specifically, the CPU 101 stores the receipt printing data in a print buffer of the RAM 103.

Next, the CPU 101 controls the transport motor 106 so that the sheet roll 20 is conveyed along the sheet transport path, in Act 3. The sheet feed roller 12 and the platen roller 13 are driven, and the leading edge of the sheet roll 20 is conveyed. Therefore, the CPU 101 controls the head driver 107 so that the receipt printing data is printed on the sheet roll 20, in Act 4. The thermal head 14 is driven and the receipt printing data stored in the print buffer is printed on the sheet roll 20 on the platen roller 13. The CPU 101 determines whether or not printing of the receipt printing data is completed, in Act 5. If the printing is not completed (No in Act 5), the CPU 101 returns to Act 4 and continues the printing control of the receipt printing data.

When the printing of the receipt printing data is completed (Yes in Act 5), the CPU 101 stops the transport motor 106 and stops the transport of the sheet roll 20, in Act 6. The CPU 101 controls the cutter motor 108 so that the cutter 15 performs the partial cutting, in Act 7. With the control, the sheet roll 20 with the leading end in a state of being discharged from the receipt issuing port 16 is cut so that a sheet piece P in front of the receipt issuing port 16 remains connected to the sheet roll 20 by a small portion.

The settlement terminal 30 starts accepting the next accounting data, assuming that the transaction for one customer has ended by issuing the receipt as described above.

Therefore, the CPU 101 starts the timer 104 as Act 8. The CPU 101 checks whether or not the timer 104 has provided a signal that the predetermined time has expired, in Act 9. When the timer 104 has not provided a signal that the predetermined time has expired (i.e., the ON signal is received) (No in Act 9), the CPU 101 checks whether or not the sensor 18 detects the sheet piece P that is partially connected to the sheet roll 20, in Act 10. If an output signal from the sensor 18 is the ON signal, the sheet piece P that is partially connected to the sheet roll 20 is detected by the sensor 18. In this case (Yes in Act 10), the CPU 101 returns to the processing of Act 9. In other words, the CPU 101 waits until the timer 104 provides a signal that the predetermined time has expired or the sensor 18 does not detect the sheet piece P, in Act 9 and Act 10.

When the output signal from the sensor 18 is switched to the OFF signal is received) before the timer 104 provides a signal that the predetermined time has expired, that is, when the sheet piece P that is partially connected to the sheet roll 20 is not detected by the sensor 18 (No in Act 10), the CPU 101 stops the timer 104, in Act 11.

On the other hand, when the output signal from the sensor 18 is not switched to the OFF signal and the timer 104 provides a signal that the predetermined time has expired, that is, when the predetermined time has elapsed in a state where the sheet piece P that is partially connected to the sheet roll 20 is still detected by the sensor 18 (Yes in Act 9), the CPU 101 controls the cutter motor 108 so that the cutter 15 performs the full cutting, in Act 12. Accordingly, the sheet piece P extending from the receipt issuing port 16 is fully cut so that the sheet piece P is no longer partially connected to the sheet roll 20. The sheet piece P then falls into the box 17 and is accommodated therein.

Here, the CPU 101 executes the processing control of Act 6 to Act 12, so that the sheet piece P on which the receipt printing data is printed by the printing unit is initially partially cut by the cutter, and then full cutting is performed on the same sheet piece P if a predetermined condition is satisfied before conveyance of sheet roll 20 is started again by the transport unit in connection with a subsequent transaction.

After the processing of Act 12, the CPU 101 stops the timer 104 as Act 11. When the processing of Act 11 is ended, the CPU 101 terminates the control procedure related to one receipt issuance.

As described above, in the receipt printer 10 of the embodiment, when the receipt printing data is received from the settlement terminal 30, the sheet feed roller 12 and the platen roller 13 are driven, the sheet roll 20 is transported to the receipt issuing port 16 along the sheet transport path and the thermal head 14 is driven, and thereby the receipt printing data is printed on the sheet piece P of the sheet roll 20. If printing of the receipt printing data is terminated, the cutter 15 performs the partial cutting and the sheet piece P extending from the receipt issuing port 16 is partially cut in front of the receipt issuing port 16. However, in this case, since the cutter 15 performs the partial cutting, a part of the sheet piece P on which the receipt printing data is printed remains partially connected to the sheet roll 20 and still extends from the receipt issuing port 16. Therefore, since the sensor 18 detects the sheet piece P, the ON signal is output from the sensor 18. In addition, in the receipt printer 10, the elapsed time from when the partial cutting is performed is measured by the timer 104. When the signal from the sensor 18 remains the ON signal (i.e., not the OFF signal) and the timer 104 has timed out, the cutter 15 performs the full cutting, and the sheet piece P remaining in the receipt issuing port 16 is completely cut and falls within the box 17.

The customer can receive the receipt by pulling the leading end of the sheet piece P discharged from the receipt issuing port 16 before the timer 104 has timed out. When the customer receives the receipt, the signal of the sensor 18 is switched from the ON signal to the OFF signal. In this case, in the receipt printer 10, the cutter 15 does not perform the full cutting and waits for the next receipt printing data.

However, the customer may return without having received the receipt (i.e., the sheet piece P). When the timer 104 has timed out without the customer taking the receipt, the cutter 15 performs the full cutting. Therefore, the sheet piece P remaining in the receipt issuing port 16 is completely cut, falls within the box 17, and is accommodated therein. Thereafter, the receipt printer 10 waits for the next receipt printing data.

Therefore, the predetermined time of the timer 104 is set as the shortest time required for the next accounting data to be sent from the registration terminal to the next customer after issuing, for example, the receipt in connection with a current transaction. Therefore, even if the previous customer does not receive the receipt, since the receipt is fully cut before the next customer approaches the settlement terminal 30, the receipt remains in the receipt issuing port 16 when the next customer approaches. Therefore, even if the previous customer does not receive the receipt, it is not a problem for the next customer.

Second Embodiment

The second embodiment includes the receipt printer 10 (FIGS. 1 and 2) connected to a self-service type settlement terminal 40 (FIG. 5) as a host machine in a receipt printer system.

Since a hardware configuration of the receipt printer 10 is common to the first embodiment, the description with reference to FIGS. 1 and 2 will be omitted.

Figure 5:
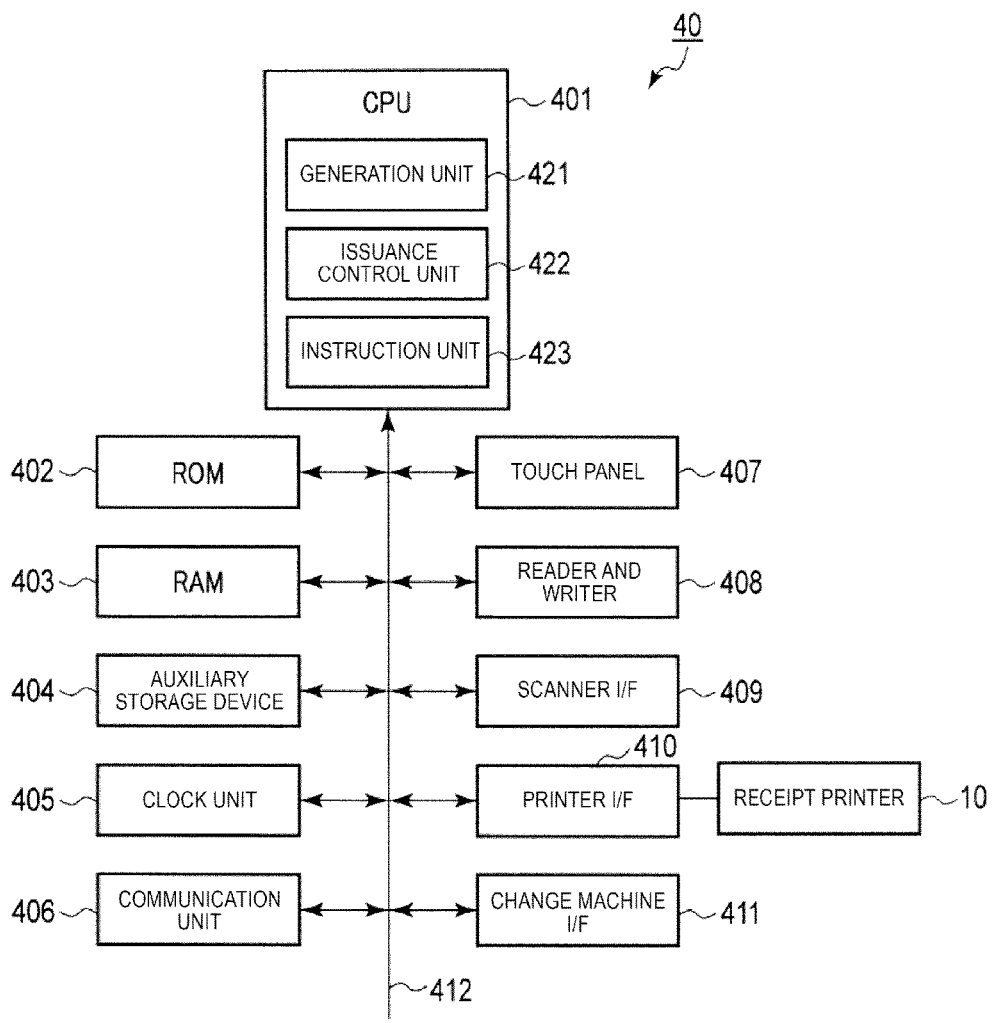
FIG. 5 is a block diagram illustrating an example configuration of a self-service type POS terminal that is a host machine of the receipt printer according to a second embodiment.

FIG. 5 is a block diagram illustrating an example configuration of the settlement terminal 40. The settlement terminal 40 includes a CPU 401, a ROM 402, a RAM 403, an auxiliary storage device 404, a clock unit 405, a communication unit 406, a touch panel 407, a reader and writer 408, a scanner interface 409, a printer interface 410, a change machine interface 411, and a system transmission path 412. The system transmission path 412 includes an address bus and a data bus, and provides communication between the CPU 401, the ROM 402, the RAM 403, the auxiliary storage device 404, the clock unit 405, the communication unit 406, the touch panel 407, the reader and writer 408, the scanner interface 409, the printer interface 410, and the change machine interface 411.

The CPU 401 is connected to the ROM 402, the RAM 403, and the auxiliary storage device 404 via the system transmission path 412, and functions as a computer. The CPU 401 corresponds to a central processor of the computer. The CPU 401 controls each unit in order to realize various functions of the settlement terminal 40 according to a program such as an operating system, middleware, and/or application program.

The ROM 402 and the RAM 403 correspond to a main memory of the computer. The ROM 402 stores the program such as the operating system, middleware, and application program. The RAM 403 stores setting data to be referred to when the CPU 401 performs various processes. The RAM 403 is also used as a so-called work area for storing data temporarily used by the CPU 401 when performing various processes. The RAM 403 may store the middleware or the application program. Similarly, the ROM 402 may also store the setting data.

The auxiliary storage device 404 corresponds to the auxiliary storage unit of the computer. For example, the HDD, the SSD, the EEPROM, or the like is used as the auxiliary storage device 404. The auxiliary storage device 404 stores data used by the CPU 401 performing various processes or data generated by the processing in the CPU 401. The auxiliary storage device 404 may store the application program.

The clock unit 405 functions as a time information source of the settlement terminal 40. The CPU 401 determines the current date and time based on the time information provided by the clock unit 405.

The communication unit 406 is a communication interface that connects to a store server via a wired or wireless network and receives data signal from the store server.

The touch panel 407 functions as an input device and a display device of the settlement terminal 40. The touch panel 407 displays a registration screen on which a name of a commodity to be registered, a money amount, or the like is displayed, a payment screen on which a total amount, a deposit amount, a change amount (electronic money balance) or the like is displayed, or the like.

The reader and writer 408 reads data recorded in a recording medium, for example, a card or an IC chip which is one type of a payment medium, and writes the data to the recording medium. The card may be anyone of various cards for recording information related to settlement processing such as a member card and a point card in addition to settlement cards such as a credit cards, a debit card, an electronic money card, and a prepaid card. The IC chip may be provided in an information terminal such as a smartphone in addition to the above-described various cards.

The scanner interface 409 connects a scanner for optically reading a code symbol such as a bar code. The scanner interface 409 receives data of the code symbol read by the scanner.

The printer interface 410 connects the receipt printer 10. The printer interface 410 outputs the receipt printing data generated by the CPU 401 to the receipt printer 10.

The change machine interface 411 connects an automatic change machine. The change machine interface 411 captures data on the denomination and amount of cash inserted into the automatic change machine. In addition, the change machine interface 411 outputs change data generated by the CPU 401 to the automatic change machine.

The settlement terminal 40 causes the CPU 401 to function as a generation unit 421, an issuance control unit 422 and an instruction unit 423 based on a control program that is one type of an application program stored in the ROM 402 or the RAM 403. The generation unit 421 generates the receipt printing data based on sales data of a commodity registered via the scanner or the touch panel 407, and payment data processed via the automatic change machine or the reader and writer 408. The issuance control unit 422 outputs the receipt printing data to the receipt printer 10 and controls issuance of the receipt on which the receipt printing data is printed. The instruction unit instructs full cutting of the receipt with respect to the receipt printer 10 when detecting a touch operation of the touch panel 407 within a predetermined time after the receipt is issued.

Figure 6:
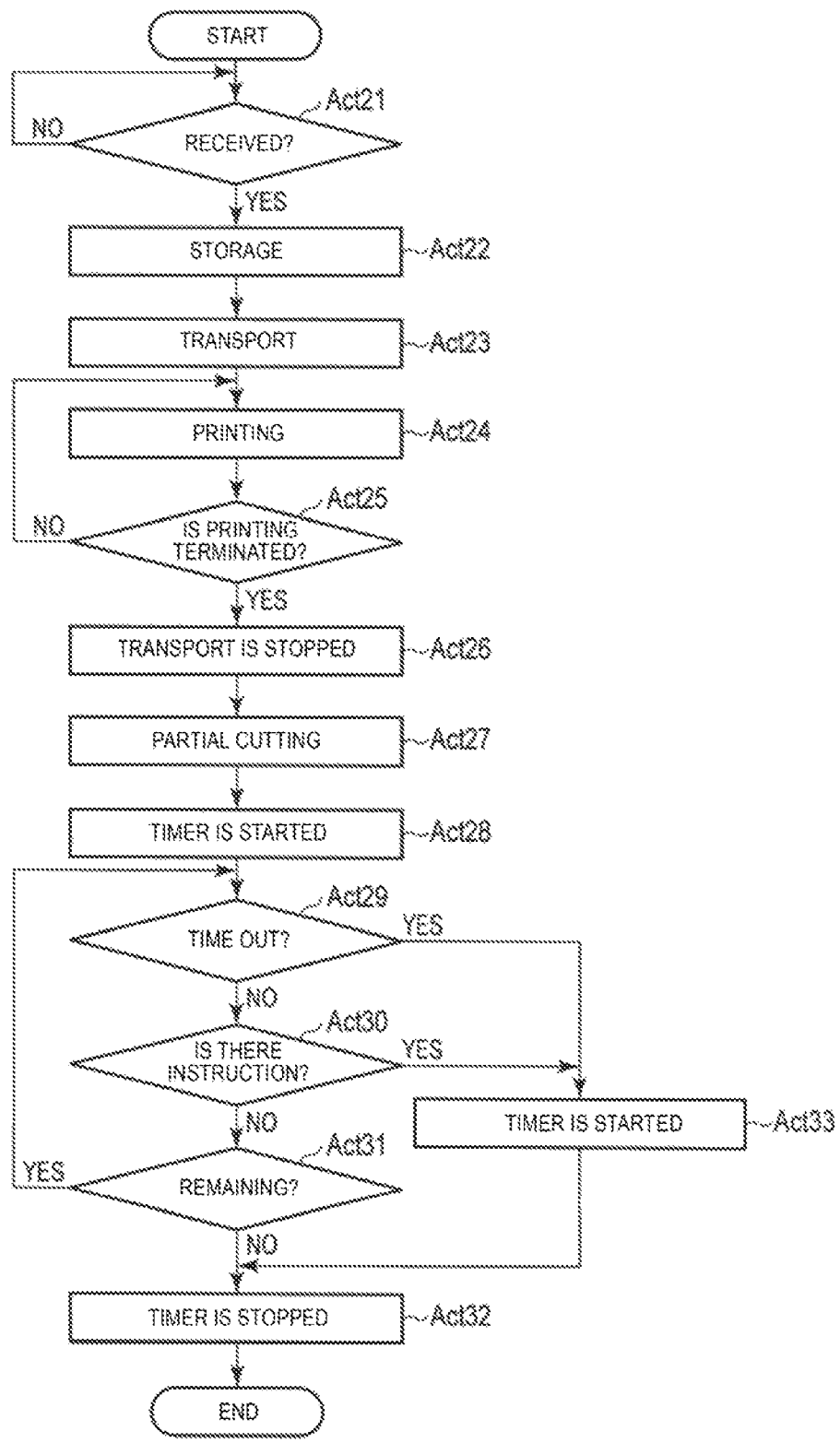
FIG. 6 is a flowchart illustrating an example sequence of operations for a control procedure related to receipt issuance executed by a CPU of the receipt printer according to the second embodiment.

FIG. 6 a flowchart illustrating an example sequence of operations for a control procedure related to receipt issuance executed by the CPU 101 of the receipt printer 10. The procedure is performed in accordance with a program stored in the ROM 102 or the RAM 103. The control procedure illustrated in FIG. 4 and described below is an example and if the same result can be obtained, the control procedure and the control content thereof are not particularly limited.

The CPU 101 waits for receipt of the receipt printing data, in a standby state, in Act 21. When the receipt printing data is received from the settlement terminal 40 via communication interface 105 (Yes in Act 21), the CPU 101 executes the same processes of those of Act 2 to Act 8 of the first embodiment, as Act 22 to Act 28, respectively.

The CPU 101 checks whether or not the timer 104 has provided a signal that the predetermined time has expired, in Act 29 after the timer is started as Act 28. When the timer 104 has not provided a signal that the predetermined time has expired, (No in Act 29), the CPU 101 checks whether or not there is a full cutting instruction from the settlement terminal 40, in Act 30. When there is no full cutting instruction (No in Act 30), the CPU 101 checks whether or not the sensor 18 detects the sheet piece P that is partially connected to the sheet roll 20, in Act 31. If an output signal from the sensor 18 is the ON signal, the sheet piece P that is partially connect to the sheet roll 20 is detected by the sensor 18. In this case (Yes in Act 31), the CPU 101 returns to the processing of Act 29. In other words, the CPU 101 waits until the timer 104 provides a signal that the predetermined time has expired, the full cutting instruction is received, or the sensor 18 does not detect the sheet 20, in Act 29 and Act 31.

When the output signal from the sensor 18 is switched to the OFF signal before there is no full cutting instruction and the timer 104 provides a signal that the predetermined time has expired, that is, when the sheet piece P is not detected by the sensor 18 (No in Act 31), the CPU 101 stops the timer 104 as Act 32.

On the other hand, when the output signal from the sensor 18 is not switched to the OFF signal and the timer 104 provides a signal that the predetermined time has expired, that is, when the predetermined time has elapsed while there is no full cutting instruction in a state where the sheet piece P partially connected to the sheet roll 20 is still detected by the sensor 18 (Yes in Act 29), the CPU 101 proceeds to Act 33. In addition, also when the full cutting instruction is received from the settlement terminal 40 before the timer 104 has timed out (Yes in Act 30), the CPU 101 proceeds to Act 33. In Act 33, the CPU 101 controls the cutter motor 108 so that the cutter 15 performs the full cutting. Accordingly, the sheet piece P extending from the receipt issuing port 16 is fully cut so that the sheet piece P is no longer partially attached to the sheet roll 20. The sheet piece P which is fully cut falls into the box 17 and is accommodated therein.

Here, the CPU 101 executes the processing control of Act 26 to Act 33, so that the sheet piece P on which the receipt printing data is printed by the printing unit is initially partially cut by the cutter, and then full cutting is performed on the same sheet piece P if a predetermined condition is satisfied before conveyance of sheet roll 20 is started again by the transport unit in connection with a subsequent transaction.

After the processing of Act 33, the CPU 101 stops the timer 104 in Act 32. When the processing of Act 32 is ended, the CPU 101 terminates the control procedure related to one receipt issuance. In addition, the settlement terminal 40 is in the idle state waiting for registration of a commodity to be purchased by the next customer.

As described above, also in the case of the receipt printer 10 of the embodiment, similar to the first embodiment, if printing of the receipt printing data is terminated, the cutter 15 performs the partial cutting and the sheet piece P extending from the receipt issuing port 16 is partially cut in front of the receipt issuing port 16. In this case, since a part of the sheet piece P on which the receipt printing data is printed remains in the receipt issuing port 16, the sensor 18 detects the sheet. When the signal from the sensor 18 is not the OFF signal, and either the timer 104 has timed out or there is full cutting instruction from the settlement terminal 40, the cutter 15 performs the full cutting, and the sheet piece P extending from the receipt issuing port 16 is completely cut and falls within the box 17.

In the settlement terminal 40, the full cutting instruction is output from the settlement terminal 40 to the receipt printer 10 when detecting a touch operation of the touch panel 407, after the settlement enters an idle state following issuance of the receipt. Normally, the touch operation of the touch panel 407, from the idle state after the receipt issuance, is performed when the next customer starts the operation of the settlement terminal 40 for accounting with respect to the purchased commodity, i.e., a subsequent transaction. In the settlement terminal 40, the full cutting instruction is output to the receipt printer 10 when the touch operation is detected. The cutter 15 performs the full cutting in the receipt printer 10 in response to the full cutting instruction. Therefore, even if the previous customer has not taken the receipt and the receipt remains in the receipt issuing port 16, the cutter 15 performs the full cutting drive when the next customer arrives. Thus, the sheet piece P is completely cut and falls within the box 17, so that it is not a problem for the next customer.

In addition, even if the timer 104 has timed out before the next customer arrives, the cutter 15 performs the full cutting. Therefore, even when the next customer does not arrive so quickly, it is possible to prevent the printed sheet piece P from remaining in the receipt issuing port 16.

Hereinafter, modification examples of the embodiments will be described. In the first and second embodiments, the sensor 18 may be omitted from the receipt printer 10. In this case, in the first embodiment, the processing of Act 10 of FIG. 4 is simplified and in Act 9, the timer 104 waits for the predetermined time to elapse. When the timer 104 provides a signal indicated that the predetermined time has elapsed, the CPU 101 causes the cutter 15 to perform the full cutting, in Act 12. In addition, in the second embodiment, the processing of Act 31 of FIG. 6 is simplified so that Act 29 and Act 30 wait for the timer 104 indicates that the predetermined time has elapsed or the full cutting instruction is received. When the timer has timed out or the full cutting instruction is received, the CPU 101 causes the cutter 15 to perform the full cutting as Act 32. Therefore, even if the customer receives the receipt, the cutter 15 performs the full cutting drive, and potential problem for the next customer can be avoided. It is possible to prevent the idle operation of the cutter 15 in advance by providing the sensor 18 as in the first and second embodiments.

According to the second embodiment, the instruction unit instructs the receipt printer 10 to perform full cutting of the receipt when detecting the touch operation of the touch panel 407 from the idle state after the receipt issuance. However, the instruction unit is not limited to the embodiment. For example, a human detection sensor may be provided in the settlement terminal 40. After the receipt is issued, once the human detection sensor stops detecting a person, full cutting of the receipt may be instructed to the receipt printer 10 when the human detection sensor subsequently detects a person. Also in this case, since the receipt left by the previous customer can be eliminated from the receipt issuing port 16 at the time when the next customer arrives, the potential problem for the next customer can be avoided.

In addition, in a case where the settlement terminal 30 is the semi-self-service type as in the first embodiment, the instruction unit may be provided in the settlement terminal 30 so as to output the full cutting instruction when the accounting data is received from the registration device.

In the first and second embodiments, the receipt printer 10 connected to the settlement terminal 30 or the settlement terminal 40. However, the receipt printer 10 may be provided in the settlement terminal 30 or the settlement terminal 40 in an integrated form. In addition, the receipt printer is not limited to being connected to the settlement terminal. For example, the receipt printer of the embodiment can be connected to an automatic accounting machine in, for example, a train station, a parking lot, a toll road, or the like.

Moreover, in general, the receipt printer is provided in a state where a program such as a control program is stored in the ROM. However, an exemplary embodiment is not limited thereto and the receipt printer may be provided in a state where the program is not stored in the ROM or in a state where another control program is stored in the ROM or an auxiliary storage unit. In this case, the control program or the like individually transferred to the receipt printer may be written in writable storage device included in the receipt printer in accordance with an operation of the user, or the above-described other control program may be rewritten. Transfer of the control program or the like can be performed by recording on a removable recording medium or by communication via a network. The recording medium may be in any form as long as the program can be stored in, for example, a CD-ROM, a memory card, or the like, and is readable by a device. In addition, a function obtained by installing or downloading a program may be one which realizes the function in cooperation with an operating system (OS) or the like inside the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A receipt printer comprising:
   a sheet roller that transports a sheet from a sheet roll to a receipt issuing port;
   a printing device that prints receipt data on the sheet;
   a cutter configured to perform full cutting so that the sheet is separated from the sheet roll and partial cutting so that the sheet remains partially connected to the sheet roll; and
   a processor configured to:
      control the cutter to perform the partial cutting after the printing device prints the receipt data on the sheet, and
      control the cutter to perform the full cutting when a predetermined condition is satisfied after the partial cutting is performed.

2. The printer according to claim 1, wherein the predetermined condition includes a predetermined time elapsing after the cutter performs the partial cutting.

3. The printer according to claim 2, further comprising:
   a sensor that detects whether the sheet remains at the receipt issuing port, wherein the predetermined condition further includes the sensor detecting that the sheet remains at the receipt issuing port when the predetermined time elapses after the cutter performs the partial cutting.

4. The printer according to claim 1, further comprising:
   a communication interface that communicates with a host machine,
   wherein the predetermined condition includes receiving, via the communication interface, an instruction from the host machine to perform the full cutting.

5. The printer according to claim 4, wherein data corresponding to the receipt data is received, via the communication interface, from the host machine.

6. The printer according to claim 1, further comprising:
   a box configured to receive the sheet after the cutter performs the full cutting.

7. The printer according to claim 1, wherein
   the sheet extends from the receipt issuing port after the cutter performs the partial cutting, and
   the sheet falls from the receipt issuing port after the cutter performs the full cutting.

8. A receipt printer system comprising:
   a host machine including:
      a first processor configured to generate receipt data based on a transaction, and
      an interface that outputs the receipt data; and
   a receipt printer including
      a sheet roller that transports a sheet from a sheet roll to a receipt issuing port, a printing device that prints information on the sheet according to the receipt data, a cutter configured to perform full cutting so that the sheet is separated from the sheet roll and partial cutting so that the sheet remains partially connected to the sheet roll, and a second processor configured to:
control the cutter to perform the partial cutting after the printing device prints the receipt data on the sheet, and control the cutter to perform the full cutting based on a predetermined condition with respect to the transaction after the partial cutting is performed.

9. The system according to claim 8, wherein the predetermined condition includes a predetermined time elapsing after accounting relative to the transaction is completed.

10. The system according to claim 9, further comprising:
a sensor that detects whether the sheet remains at the receipt issuing port, wherein the predetermined condition further includes the sensor detecting that the sheet remains at the receipt issuing port when the predetermined time elapses after the accounting relative to the transaction is completed.

11. The system according to claim 8, wherein the host machine further includes:
an input device that receives instructions from a user, wherein the predetermined condition includes receiving, via the input device, an instruction to perform the full cutting.

12. The system according to claim 8, wherein the receipt printer further includes:
a box configured to receive the sheet after the cutter performs the full cutting.

13. The system according to claim 8, wherein
the sheet extends from the receipt issuing port after the cutter performs the partial cutting, and
the sheet falls from the receipt issuing port after the cutter performs the full cutting.

14. A method of issuing a receipt comprising the steps of:
transporting a sheet from a sheet roll to a receipt issuing port;
printing receipt data on the sheet;
partially cutting the sheet with a cutter so that the sheet remains partially connected to the sheet roll after printing the receipt data on the sheet; and
fully cutting the sheet with the cutter so that the sheet is separated from the sheet roll after the partial cutting and after a predetermined condition is satisfied.

15. The method according to claim 14, wherein the predetermined condition includes a predetermined time elapsing after the cutter performs the partial cutting.

16. The method according to claim 15, further comprising the step of:
detecting, with a sensor, whether the sheet remains at the receipt issuing port, wherein the predetermined condition further includes the sensor detecting that the sheet remains as the receipt issuing port when the predetermined time elapses after the cutter performs the partial cutting.

17. The method according to claim 14, wherein the predetermined condition includes receiving, via a communication interface, an instruction from a host machine to perform the full cutting.

18. The method according to claim 17, wherein data corresponding to the receipt data is received, via the communication interface, from the host machine.

19. The method according to claim 14, further comprising:
after the full cutting, receiving the sheet in a box provided in a housing.

20. The method according to claim 14, wherein
the sheet extends from the receipt issuing port after the cutter performs the partial cutting, and
the sheet falls from the receipt issuing port after the cutter performs the full cutting.

* * * * *